United States Patent [19]
Cunha

[11] 3,801,136
[45] Apr. 2, 1974

[54] LUBRICANT DRIP PREVENTER FOR A FIFTH WHEEL

[75] Inventor: Joseph J. Cunha, Castro Valley, Calif.

[73] Assignee: Cunha Products, Inc., Hayward, Calif.

[22] Filed: Jan. 26, 1973

[21] Appl. No.: 326,674

[52] U.S. Cl............... 280/433, 184/106, 308/136
[51] Int. Cl............................................ B62d 53/08
[58] Field of Search ............ 280/433, 125; 184/106; 308/136

[56] References Cited
UNITED STATES PATENTS

| 2,868,329 | 1/1959 | Phelps | 184/106 |
| 2,960,352 | 11/1960 | Wood | 280/433 |
| 3,000,653 | 9/1961 | Wood | 280/433 |
| 3,370,866 | 2/1968 | Mitchell et al. | 280/404 |
| 3,463,512 | 8/1969 | Hodgson | 280/433 X |
| 3,622,173 | 11/1971 | Hodgson | 280/125 |

*Primary Examiner*—Leo Friaglia
*Attorney, Agent, or Firm*—Naylor, Neal & Uilkema

[57] ABSTRACT

An impervious trough surrounding a portion of the periphery of a fifth wheel. The trough is V-shaped, one side being formed by the edge surface of the fifth wheel, the other surface being formed by a band fastened to the edge surface. The band resides at an angle to the edge surface of about 45° to facilitate cleaning the trough. The upper edge of the band resides below the bearing surface of the fifth wheel to avoid interference therewith.

8 Claims, 4 Drawing Figures

PATENTED APR 2 1974 3,801,136

LUBRICANT DRIP PREVENTER FOR A FIFTH WHEEL

This invention relates to a fifth wheel as is present on a tractor for effecting connection of a semi-trailer thereto and more particularly to a lubricant drip preventer for such fifth wheel.

In order to afford free pivotal movement of a semi-trailer with respect to the tractor that is pulling the semi-trailer, the rubbing surfaces of the fifth wheel connection therebetween are typically coated with a thick viscous grease, or like lubricant. The rubbing surfaces are subjected to substantial pressure, due to the weight of the load in the semi-trailer, and are subject to rubbing movement during coupling of the semi-trailer to the fifth wheel and due to the continual turning of the semi-trailer with respect to the tractor. Accordingly, the lubricant that is placed on such surfaces prior to connection of the semi-trailer to the tractor is extruded from the space between the surfaces during use of the tractor-semi-trailer combination. The location at which the lubricant is extruded is typically in vertical alignment above the hoses and cables that extend from the tractor to the trailer. Lubricant contacting such hoses and cables renders inconvenient their connection or disconnection and also collects dirt and may well deleteriously affect the material of which the hoses and cables are made.

Accordingly, the principal object of the present invention is to provide a structure for preventing such extruded lubricant from dripping from the fifth wheel connection. This object is achieved by providing around at least part of the periphery of the fifth wheel a lip that forms a trough which receives and retains such lubricant as is extruded from between the mating surfaces of the fifth wheel.

Another object of the present invention is to provide such a drip preventer that in no way interferes with the normal operation of the fifth wheel connection. The present invention achieves this object because the drip preventer structure is located below the surface of the fifth wheel and forward of the axis of pivotal movement between the connection whereby neither connection and disconnection procedure nor the turning capability of the joint is impaired.

Still another object of the present invention is to provide a drip preventer that can be added to existing fifth wheels or installed on new fifth wheels during fabrication thereof. The present invention affords attainment of this object because the drip preventer is a trough that is defined in part by the side or edge surface of the fifth wheel and in part by a relatively narrow strap added to such surface.

Yet another object of the present invention is to provide a drip preventer so adapted that the lubricant received and retained thereby can be quickly and conveniently removed therefrom so that further lubricant extruded from the rubbing surfaces of the wheel will not overflow the trough included in the present drip preventer. This object is realized according to the present invention, as the trough that forms the drip preventer preferably is a V-shaped trough wherein the angle included between the two surfaces of the trough is at least about 45 degrees. Therefore, the sides of the trough are readily accessible to scraping tools.

The foregoing, together with other objects, features and advantages, will be more apparent after referring to the following specification and accompanying drawing in which.

Figure 1:
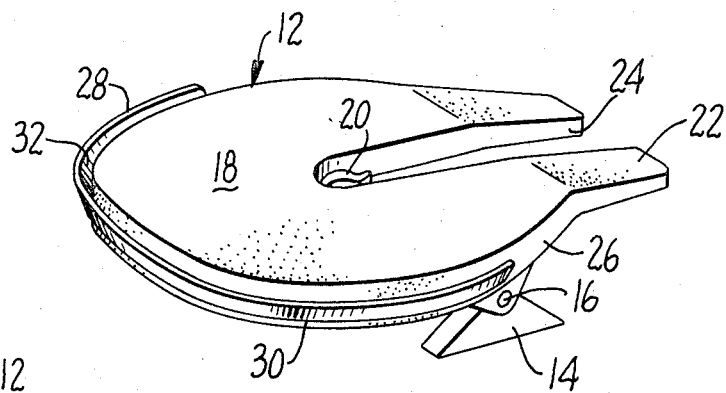
FIG. 1 is a perspective view of a fifth wheel provided with a drip preventer according to the present invention.

Referring more particularly to the drawing, reference numeral 12 indicates a fifth wheel of conventional form which is mounted to the rear end of a tractor (not shown) via a trunnion connection 14 that affords pivotal movement about the axis of a pin 16 that forms part of the trunnion. As is conventional, fifth wheel 12 is formed by a rigid member that defines a flat surface 18 on which bears and rubs a complemental surface on a semi-trailer. The semi-trailer and complemental surface are shown in phantom lines in FIG. 3 and designated by the numerals 17 and 19, respectively. Centrally of surface 18 is a mechanism 20 for engaging a king-pin, shown in phantom lines in FIG. 3 and designated 21, on the semi-trailer so that the semi-trailer is supported for pivotal movement about a generally vertical axis through the mechanism 20. Thus, the semi-trailer rubs on the surface 18 as the tractor turns with respect to the trailer. Also conventional for expediting attachment of the semi-trailer to fifth wheel 12 is a downwardly sloping ramp 22 on the rear portion of the fifth wheel and a centrally located forwardly converging slot 24 which guides the king-pin on the semi-trailer to proper juxtaposition to element 20.

In order to facilitate coupling and pivotal movement of the semi-trailer with respect to the fifth wheel, surface 18 is coated with thick grease or like lubricant. As the trailer is subject to vibration and turning during travel of the tractor-semi-trailer combination, the grease on surface 18 is extruded from the space between the surface and the complemental surface on the semi-trailer. In accordance with the present invention, such extruded grease is caught and retained and is not permitted to fall on the highway, over which the truck is proceeding, nor on the air hoses and/or electric cables that extend beneath the fifth wheel from the tractor to the trailer.

Flat surface 18 of the fifth wheel is peripherally bounded by peripheral edge surface 26 which is typically a member that is cast integral with surface 18 and imparts strength to the entire fifth wheel structure. According to the present invention, there is secured to edge surface 26 a strap or band 28 which can be made of steel so as to present an impervious surface to grease coming in contact therewith. Strap 28 is cut from a flat piece of steel in two identical sections and is then welded as at 30 to edge 26 of the fifth wheel. Conforming the strap to the periphery of the fifth wheel causes it to assume an upward and outward slope as seen most clearly in FIG. 3 so that there is defined between the surface of strap 28 and edge surface 26 a trough, identified by reference numeral 32. It will be noted that the trough is upwardly opening and is of generally V-cross-sectional shape, the angle included between edge surface 26, and the strap 30 being an acute angle. Preferably, the angle is at least about 45° so that the grease, received and retained within trough 32, can be rapidly removed therefrom by a scraper or like tool.

In one structure, designed according to the present invention, strap 28 is formed of two identical pieces of 16- or 18-gauge stainless steel which are installed symmetrically of the center line 33 of the fifth wheel. The straps are cut from sheet material at a radius of curvature such that when mounted to edge surface 26 they will conform to the periphery of the fifth wheel in a sloped position. Because of this construction technique, a series of discrete spaced-apart weldments 30, 30a, 30b suffice to retain strap 28 in place rather than necessitating a continuous weld bead throughout the length of the strap.

Figure 2:
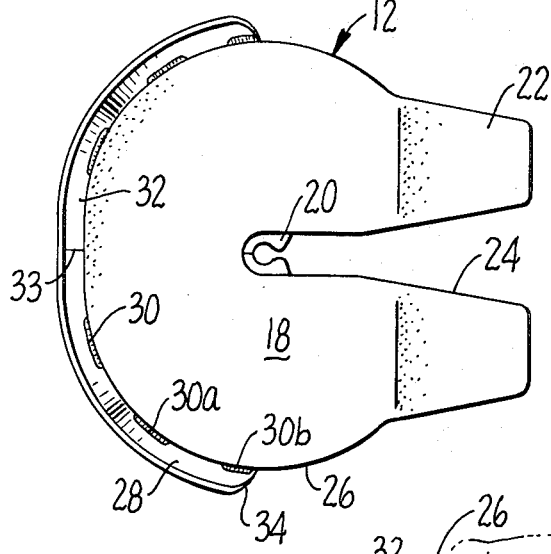
FIG. 2 is a plan view of the fifth wheel of FIG. 1.
Figure 3:
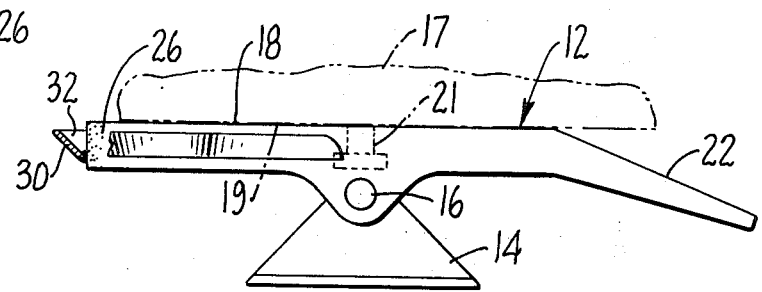
FIG. 3 is a side view of the fifth wheel of FIG. 1; with phantom lines showing a fragmentary representation of a semi-trailer attached thereto; and, FIG. 4 is a perspective view of a fifth wheel employing another embodiment of the present invention.
Figure 4:
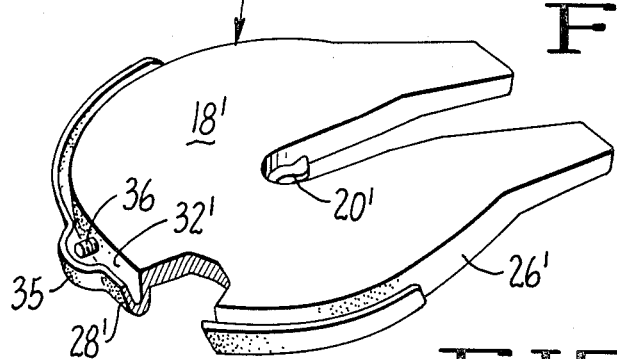

As can be seen in FIGS. 2 and 3, strap 28 terminates at a lateral extremity 34 that is forward of the axis of coupling mechanism 20 and forward of the axis of pin 16 of trunnion 14. Moreover, as seen in FIG. 3, the strap is confined within the vertical extremities of edge surface 26 to the end that addition of the strap and the trough defined thereby in no way impairs the operation of the fifth wheel and its accouterments A modification is shown in FIG. 4 and similarly functioning parts are identified by the same reference numerals as used in FIGS. 1 – 3 with the addition, however, of a prime to each numeral. Thus, the fifth wheel 12' of FIG. 4 has a flat surface 18' which is bounded by an edge surface 26'. Cast integrally with fifth wheel 12' is a trough defining member 28' which in cooperation with edge surface 26' defines a trough 32' that circumscribes the periphery of at least the front portion of the fifth wheel. As can be seen in FIG. 4, strap 28' has at the longitudinal center thereof a forward extending projection 35 which defines in trough 32' a clearance space for a stud 36 that constitutes a part of coupling mechanism 20'. In installations in which the strap is added by welding to edge surface 26 of the fifth wheel, the two individual sections that constitute a strap 28 can be spaced apart at the center 33 to define a clearance space for stud 36. A gap in trough 32 is formed thereby but such gap can be tolerated because the grease or like lubricant used on surface 18 is typically so thick or viscous that it will not flow toward such gap as may exist in the trough.

In summary and recapitulation of the operation of the present invention, it should be appreciated that lubricant is first applied to surface 18, after which the tractor on which the fifth wheel is mounted backs toward the semi-trailer until engagement is achieved. Any lubricant extruded or scraped from surface 18 during such procedure will be received and retained in trough 32. As the tractor-semi-trailer unit proceeds, any further lubricant that is expelled or extruded from the space between surface 18 and the complemental surface on the semi-trailer will be similarly received and retained within the trough. Accordingly, neither the hoses nor cables extending between the tractor and the semi-trailer nor the road surface, over which the vehicle travels, will be soiled by the grease.

Thus, it will be seen that the present invention provides a structure for receiving and retaining lubricant that is inevitably extruded from between the fifth wheel and the complemental structure on the semi-trailer attached to the fifth wheel. The structure of the invention achieves its purpose in a simple, inexpensive manner which can be applied to existing fifth wheels or to newly manufactured fifth wheels. Finally, the advantages of the invention are achieved without in any way impairing the normal operation of the fifth wheel.

Although two embodiments of the invention have been shown and described, it will be obvious that other adaptations and modifications can be made without departing from the true spirit and scope of the invention.

What is claimed is:

1. In combination with a fifth wheel that is adapted for mounting on a tractor for effecting coupling of a semi-trailer thereto, said fifth wheel having a flat surface and means for effecting attachment of the semi-trailer for pivotal movement about an axis normal to said flat surface, said semi-trailer having a complementary surface that makes rubbing contact with said flat surface, the improvement comprising means for forming a trough circumscribing the forward portion of said fifth wheel, said trough forming means residing below said flat surface, so that lubricant between said surfaces that is extruded from therebetween deposits in said trough.

2. The invention of claim 1 wherein said trough forming means includes an edge member depending from the periphery of said flat surface and defining an edge surface generally normal to said flat surface, and an impervious band secured to said edge surface and extending upward and outward from said edge surface at acute angle of at least about 45°.

3. The invention of claim 2 wherein said band and said edge member are integral.

4. The invention of claim 1 wherein said trough forming means is confined to the portion of said fifth wheel forward of said axis.

5. The invention of claim 1 wherein said coupling means includes a stud projecting beyond the forward extremity of said flat surface and wherein said trough defining means includes a forward extending portion that forms a clearance space for said stud.

6. In combination with a fifth wheel that is adapted for mounting on a tractor for effecting coupling of a semi-trailer thereto, said fifth wheel having a flat surface and means for effecting attachment of the semi-trailer for pivotal movement about an axis normal to said flat surface, said flat surface being at least partially bounded by a depending edge surface generally normal to said flat surface, said semi-trailer having a complementary surface that makes rubbing contact with said flat surface, the improvement comprising a strap having a substantially impervious surface and means for attaching said strap to said edge surface so that the angle between said impervious surface and said edge surface is an acute angle and so that an upward opening trough is defined between said impervious surface and said edge surface adjacent to and below said flat surface for receiving and retaining lubricant extruded from between said flat surface and said complementary surface.

7. A method for forming a drip preventer lip for a fifth wheel of the type that has a flat bearing surface, a trailer coupling mechanism centrally of said surface and an edge member perpendicularly depending from at least the forward peripheral portion of the flat surface to define an edge surface, the method comprising the steps of providing an impervious band having first and second generally parallel edges, deforming the band so that the first edge conforms to the edge surface, and attaching the first edge of the band to the edge surface so that the second edge of the band is below the flat surface and so that the band resides at an angle of at least about 45° to the edge surface to form an upward opening trough adjacent and below the periphery of the flat surface.

8. A method according to claim 7 wherein said providing step includes providing first and second identical band segments, and wherein said attaching step includes attaching the segments on opposite sides of the center line of the fifth wheel in symmetry of the center line.

* * * * *